United States Patent [19]

Kuceski

[11] 4,185,150

[45] Jan. 22, 1980

[54] PRODUCTION OF POLYAMIDES FROM DICARBOXYLIC ACIDS PRODUCED BY NITRIC ACID OXIDATION OF ORGANIC MATERIAL

[75] Inventor: Vincent P. Kuceski, Chicago Heights, Ill.

[73] Assignee: The C. P. Hall Company, Chicago, Ill.

[21] Appl. No.: 869,062

[22] Filed: Mar. 20, 1978

Related U.S. Application Data

[63] Continuation-in-part of Ser. No. 556,608, Mar. 10, 1975, abandoned.

[51] Int. Cl.² .............................................. C08G 69/28
[52] U.S. Cl. ...................................... 528/336; 528/342
[58] Field of Search ............................... 528/336, 342

*Primary Examiner*—Harold D. Anderson
*Attorney, Agent, or Firm*—Mason, Kolehmainen, Rathburn & Wyss

[57] ABSTRACT

Aqueous bleed streams containing soluble aliphatic dicarboxylic acids from the nitric acid oxidation of organic materials and production of dicarboxylic acids, are processed to neutralize or remove nitric acid and also catalysts, if desired, and are then reacted with polyfunctional amines to form polyamides useful in numerous commercial applications.

8 Claims, 1 Drawing Figure

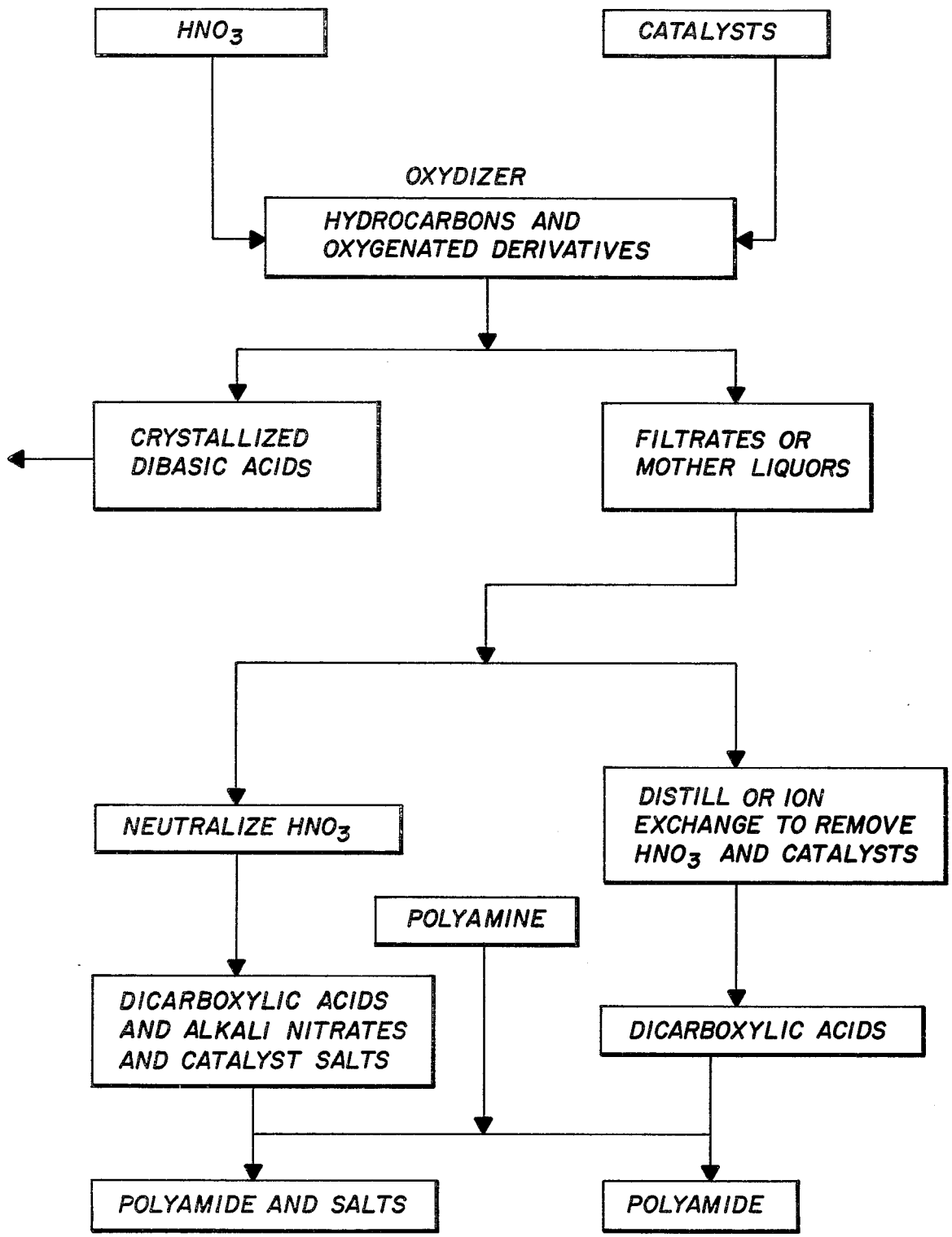

PRODUCTION OF POLYAMIDES FROM DICARBOXYLIC ACIDS PRODUCED BY NITRIC ACID OXIDATION OF ORGANIC MATERIAL

This application is a continuation-in-part of my application Ser. No. 556,608 filed Mar. 10, 1975, now abandoned.

BACKGROUND OF THE DISCLOSURE

Because of the world-wide shortage of petroleum-based raw materials, it is imperative that recovery and recycle technology be developed to conserve the supply of petroleum and utilize dicarboxylic waste streams to the fullest advantage.

One of several such waste streams is a so-called bleed stream from adipic acid manufacture. Such a waste stream generally consists of:

| | |
|---|---|
| $HNO_3$ | 2–25% |
| Succinic Acid | 3–10% |
| Glutaric Acid | 8–35% |
| Adipic Acid | 3–8% |
| Water | Balance |

The mother liquor from oxidation of various organic compounds, as described in Kuceski U.S. Pat. No. 2,824,122 may be used.

The art is well aware of the existence of such bleed streams which presently are burned or sewered to dispose of them. Such disposal is not only an economic burden but a source of pollution as well.

This waste stream is called a bleed stream by those in the adipic acid industry because it is a stream bled from the filtrate liquors from adipic acid purification procedures in order to remove contaminants which build up in the liquors.

Bleed streams formed in the nitric acid oxidation of cyclohexane, cyclohexanol and cyclohexanone and mixtures thereof, produce significant amounts of succinic acid and glutaric acid as byproducts with the desired adipic acid, as indicated in the foregoing table. The adipic acid is needed in high purity in order to make it feasible for use in making nylon. Therefore, contamination of it with other dibasic acids is undesirable. In the usual practice of obtaining maximum yields of adipic acid, adipic acid is crystallized from the oxidized reaction mixture and the filtrate is concentrated and then further crystallized to obtain additional amounts of adipic acid. This process is repeated until the adipic acid which is crystallized becomes impure because of co-crystallization of the byproduct succinic acid and glutaric acid which are present. Many times there is recycling of the filtrate to the first crystallization stage or other steps, but eventually the concentration of succinic acid and glutaric acid builds to such a high concentration that further concentration and crystallization yield only mixtures of other dibasic acids with the adipic acid. Before this point is reached, a portion of the filtrate is bled off and added to the stream from which adipic acid is crystallized. Hence, the name bleed stream.

This bleed stream is not a small factor in the United States today. The dibasic acids in bleed streams from adipic acid plants in the U.S. amount to as much as 200 million pounds per year. If nitric acid and water of solution are also included, the weight of the bleed stream amounts to as much as one billion pounds per year.

Therefore, the bleed streams which are formed are substantial in quantity and contain valuable dibasic acids which heretofore could not be utilized as such economically or realistically because of the great amount of nitric acid, and catalyst also in most plants, which remains with the dibasic acids in solution.

It is quite evident therefore, that if a use can be made for such a bleed stream, per se, not only economic values would be realized but an economic burden would be avoided because of the cost of disposal of a large amount of bleed stream.

One of the large requirements in the United States and foreign countries is for a series of polyamides which are useful as such or as intermediates in the manufacture of water-treating compounds, paper-retention aids, or as coatings, and as wet-strength resins for paper.

PRIOR ART

An article describing the process of making adipic acid using cyclohexane as a source material together with a diagrammatic flow sheet is described on pages 74–79 of the May 1956 issue of *Petroleum Processing*. In the patent literature U.S. Pat. Nos. 2,791,566; 2,840,607; 3,338,959; 2,971,010; 2,439,513; and 2,557,282 explain the process of making adipic acid and derivatives thereof.

Heretofore, resins have been made from amides, etc. according to the teachings of numerous U.S. Pat. Nos., such as, 2,595,935
2,832,799
2,926,154
3,197,427
3,240,761
3,250,664
3,320,215
3,442,754
3,622,604

However, many of these add additional chemical agents to the initial polyamide which is formed. No one suggests using the dicarboxylic acid from the nitric acid oxidation bleed stream to which this invention relates. The bleed streams may contain other acids, including pimelic, suberic, azelaic, or sebacic acids. Processes which produce dicarboxylic acids are described in U.S. Pat. Nos. 2,744,067; 2,768,201; 2,824,122; 2,824,135; and 2,841,601.

SUMMARY OF THE INVENTION

Organic materials, and particularly hydrocarbons and oxygenated derivatives thereof, are oxidized with nitric acid to produce dicarboxylic acids. The oxidation produces a mixture of adipic, glutaric and succinic acids, and possibly other acid such as pimelic, suberic, azelaic and sebacic acids. The demand for adipic acids has been so great and the demand for glutaric and succinic, etc. acids so small that many plants recover only the adipic acid which can be done by concentration and crystallization. According to this invention, the unrecovered acids, which are generally the $C_4$ to $C_{10}$ acids, are used in the production of polyamides which can be separated from the bleed stream before or after recovery of the catalyst.

DETAILED DESCRIPTION

The above summary indicates a simple reaction between a polyamine and a bleed stream which contains dicarboxylic acids, usually metal catalyst, HNO₃ and water. However, such a bleed stream may require special treatments to make it entirely suitable for the process of this invention. Suitable treatments are indicated here:

(1) Neutralization by caustic or amine or removal of nitric acid or a combination of such steps. In order to make a suitable polyamide, the nitric acid content of the bleed streams should not be greater than about 15 percent by weight. It may be neutralized or removed by any one of the following methods.
  a. Distillation or steam distillation to reduce the nitric acid content to a low value.
  b. Removal of nitric acid by ion exchange. The ion exchange resin should remove the nitric acid in preference to carboxylic acid. A weakly basic resin with high capacity is preferred since it will react with and retain the stronger nitric acid while releasing the weaker carboxylic acids. Stronger anionic resins may be employed, and used according to well known methods in the art.
  c. The nitric acid may be removed from reactivity by neutralization with an alkaline metal such as the alkaline metals of Group I and II of the periodic table, and this may remove catalyst also. Urea may be added to inhibit oxidation in subsequent steps. An example of this procedure follows: Caustic soda or other alkali is added to the bleed stream to bring the pH to about 2.5 to 4, and preferably about 3. This insures neutralization of nitric acid without neutralizing carboxylic acid that is present. The temperature of the solution when treated with amine may be 80° to 240° C. The solution may contain any reasonable percentage of dicarboxylic acid, and polyamine is added to react with part or all of the carboxylic acid groups which are present.

A preferred method of nitric acid removal by ion exchange is described in U.S. Pat. No. 3,186,952, which can be combined with other methods to remove all nitric acid and catalysts. The removal of the catalyst by this method can precede or follow the reaction with the polyamide.

It is not always necessary that the polyamide be a light color, therefore, it is not always necessary to remove or neutralize the nitric acid or catalyst.

The amines with which the solution is made to react in the preparation of polyamines belong to the class of di- and polyfunctional amines. General formulae of the better known amines that may be used include:

Alkylene diamines—$NH_2$-$(CH_2)_n$-$NH_2$ in which n is 2 to 20 or more.

Alkanol amines—$(HO.C_2H_4)_nNH_{3-n}$ in which n is 1 to 3.

Polyalkylene polyamines—$NH_2(C_xH_{2x}.NH)_nC_xH_{2x}.NH_2$ in which x is 2 to 6 and n is 1 to 20.

Polyoxyalkylene alpha-omega diamines—$NH_2(CH_2.CH_2.O)_n$-$CH_2.CH_2.NH_2$ in which n is 1 to 20.

Amino-alkylalkanolamines—$H_2N.R.NH.R.OH$ in which each R is an alkylene group of 2 to 4 carbon atoms.

The hydrocarbon groups of the foregoing formulae may be halogen substituted.

Tallow diamines—$R.NH.R'.NH_2$ in which R is a hydrocarbon containing 14 to 18 carbon atoms and R' is ethylene or propylene.

The polyamine which is used in making the resin is usually a polyalkylene amine or an aliphatic diamine or a mixture thereof. It may contain an aliphatic ether, hydroxyl, halogen or alcohol group, and may include cyclic and branched chain as well as straight-chain compounds. The polyamines include polyethylene polyamines, propylene diamine, polypropylene amines, polyoxyethylene diamine, alpha-omega diamines, hexamethylene diamine, dicyclohexylene diamine, tallow diamines, tridecyl ether diamine, bis(hexamethylene) triamine, amino-ethylethanolamine; aromatic polyamines such as polymethylene polyphenyl amine, p,p'-methylene dianiline, piperazine, N,N-bis(3-aminopropylmethyl) amine, etc. The amines which are preferred are the amines based on ethylene such as ethylene diamine, diethylenetriamine, triethylenetetramine, tetraethylene pentamine, hexamethylene diamine, polyhexamethylene polyamine and mixtures of such amines. Thus, the amines may be aliphatic or aromatic but must contain at least two amino groups separated by at least two carbon atoms. They may contain as many as 12 or 14 or more carbon atoms. The crude mixtures of difunctional amines obtained when ammonia is reacted with mixtures containing 1,2-ethylene dichloride, propylene dichloride, etc., may be used without extensive refinement except for removal of water, excess ammonia, and unreacted chlorides. An alkylene diamine or dialkylene triamine in which the alkylene group or groups contain 2 or 3 carbon atoms is preferred. Ethanolamine, diethanolamine, and triethanolamine may be used. In the latter case, the hydroxyl groups as well as the amino groups react.

The solution is brought to a pH of 2 to 4 for treatment with the polyamine.

The drawing is a flow sheet which is included to assist in disclosing the invention.

The following examples are illustrative of the general procedure.

EXAMPLE I

As a starting material mother liquor containing catalyst and dicarboxylic acids from which adipic acid had been crystallized, was employed as the source of carboxylic acid. The average composition of this solution was:

2.2% nitric acid
28.4% organic dibasic acids (mol. wt. of dried sample: 134)
0.46% copper
0.10% Va as ammonium meta vanadate
0.0024% iron
Balance water 1000 ml of this bleed stream mother liquor was added to a three-necked flask equipped with agitator and nitrogen gas inlet. The material was boiled to liberate water of solution, under vacuum conditions if necessary to reduce decomposition, to concentrate the solution to about 10% to 75% of its original volume. The nitric acid in the distilled solution should not exceed about 15%, preferably no more than 5% by weight. The solution of this example was concentrated to 60% of its original volume, containing 3% HNO₃. This nitric acid was neutralized by adding caustic soda in water solution to a pH of 3. Then 220 grams of diethylene triamine were added to the concentrated solution in the flask very slowly to prevent flash-over of the amine. After all the amine was added, heating was resumed to remove water and to cause the amide reaction to proceed. Urea (1 gm) was added to inhibit oxidation. The solution was heated until water of solution and water of reaction were driven off and a temperature of 160° C. was reached. The temperature was kept at 160°–165° C. until the amide reaction was completed. The resulting amide is water soluble and may be used in various ways as known in the art.

EXAMPLE II

In this example the bleed stream is treated for removal of catalyst before conversion to the polyamide.

Adipic acid bleed stream of the following ranges in composition was used:

| | |
|---|---|
| HNO₃ | 2–25% |
| Organic dibasic acids | 5–40% |
| VA as Ammonium Vanadate | 0.01–1.5% |
| Copper | 0.11–5.0% |
| Water and other components | Remainder |

A grab sample from such a bleed stream is adjusted to a pH between 0.3–1.8 by distillation to remove the nitric acid and/or by dilution with water. It has the following composition:

| | |
|---|---|
| HNO₃ | 4.2% |
| Organic dibasic acids | 28.4% |
| Copper | 0.7% |
| Vanadium as Ammonium Vanadate | 0.1% |
| Iron | 0.02% |
| Water | Remainder |

Some water is added to this stream and the resulting stream is passed through cation exchange resins as described in Brubaker et al., U.S. Pat. No. 3,186,952 to yield a stream having the following composition:

| | |
|---|---|
| Adipic acid | 6% |
| Glutaric acid | 14% |
| Succinic acid | 6% |
| Nitric acid | 3.5% |
| Vanadium as Ammonium Vanadate | 150 ppm |
| Copper | 1 ppm |
| Iron | 2 ppm |

This stream is then steam distilled to remove substantially all the nitric acid and then concentrated to 70 percent solids to give an organic dibasic acid concentrate containing 280 grams of a mixture of adipic, glutaric, and succinic acid having an equivalent weight average of 132 and a pH of 3.0.

To this was added slowly 220 grams of diethylene triamine, and when the heat of reaction subsided, heat was applied to cause the polyamide to form.

Instead of treating the mother liquor with alkali or distilling to remove the nitric acid, it may be removed by ion exchange. Such procedures are well known in the art. This may be done without removing the catalyst. The catalyst may then be removed before treatment with the polyamine, but this is not necessary.

EXAMPLE III

In the following experiment there is shown a practical application of the polyamide formed by the process of this invention.

Another typical plant bleedstream is given as follows:

| | |
|---|---|
| Monobasic acids | 0.2% |
| Succinic acid | 8.7% |
| Adipic acid | 5.5% |
| Glutaric acid | 12.0% |
| HNO₃ acid | 9.3% |
| Catalyst | 2.2% |
| The remainder is water. | |

This bleedstream mother liquor is passed continuously through a stream stripping operation at a temperature of between 90° and 150° C. at a pressure of 90 to 400 mmHg to remove most of the nitric acid and water to give a highly concentrated solution which upon dilution with an equal volume of water gives a pH of at least 1.2 but not greater than 2.2. The vanadium is then precipitated by cooling the solution. The filtrate, substantially free of Va salts, is then passed through a cationic exchange resin to remove the copper. The resulting liquor can be used advantageously in the production of the polyamides of this invention.

The liquor is then concentrated again to about 75% solids.

A quantity of this concentrate containing 2.0 moles of dicarboxylic acids and 0.2 percent nitric acid was utilized to make a polyamide as follows:

To the flask containing the bleedstream dicarboxylic acids, which dicarboxylic acid had an average molecular weight of 134, was added 415 grams of tetraethylene pentamine. The mixture was heated to 170° C. and kept between 170°–175° C. for 100 minutes. The mixture was then cooled to 140° C. and diluted with water to 80° C. The polyamide solution then was about 50 percent total solids. This solution was added to a much larger flask containing 2600 grams of water and then heated to 50° C. Four hundred fifty-four (454) grams of epichlorohydrin was added to this solution over a period of 15 minutes. The solution was then heated to 65° C. and held at this temperature until it reached a viscosity of E on the Gardner-Holdt scale. It was then diluted with 2500 ml of water and the pH adjusted to 5.0 with dilute HCl. the product then contained 10 percent solids.

This solution then was tested as a 2 percent solution as a wet strength resin on Kraft handsheets. The pH was adjusted to 9.0 before wetting the paper. The Mullen burst tests before curing were 7.0 pounds per square inch and after curing gave a burst test of 17.0 pounds per square inch.

Similar applications of the bleedstream can be made in making the material described in U.S. Pat. Nos. 2,832,799; 2,926,154; 3,197,427; 3,240,761; and 3,442,754.

I claim:

1. The method of producing a polyamide from a polyamine in an acid aqueous solution of a mixture of nitric acid, metal catalyst and dicarboxylic acid obtained from the nitric acid-metal catalyst oxidation of organic material which is oxidizable to dicarboxylic acid, which method comprises adjusting the pH of said solution to 2 to 4, and then adding polyamine which contains at least two amino groups separated by at least two carbon atoms, and heating to a temperature at which a substantial portion of the polyamine reacts with said dicarboxylic acid and produces polyamide.

2. The method of claim 1 in which the polyamine is an alkylene polyamine comprising at least two carbon atoms between each two amine groups.

3. The method of claim 1 which comprises treating a mixture containing adipic, glutaric and succinic acids, adjusting the pH of the solution within the range of 2.5 to 3.5, and then adding diethylene triamine.

4. The method of claim 1 which comprises raising the pH by distillation of nitric acid from the solution.

5. The method of claim 1 which comprises raising the pH by neutralization of the nitric acid with an alkali.

6. The method of claim 1 which comprises removing metal catalyst by treating said solution with ion exchange resin.

7. The method of producing a polyamide from a polyamine in an aqueous solution which contains nitric acid, 5 to 40 percent of dicarboxylic acid, and metal catalyst, which solution is obtained from nitric acid-metal catalyst oxidation of source material selected from the class consisting of cyclohexanol, cyclohexanone and cyclohexane, which method comprises adjusting the pH of said solution to between 0.3 and 1.8, passing said adjusted solution through cationic ion exchange resins to remove catalyst, reducing the nitric acid content of the resulting solution to no greater than 15 percent, adjusting the pH of the solution to 2 to 4, adding polyamine thereto which contains at least two amino groups separated by at least two carbon atoms and heating to a temperature at which a substantial proportion of the polyamine reacts with said dicarboxylic acid and produces polyamide.

8. The method of producing a polyamide, which comprises producing an aqueous solution of the following composition:

| Nitric acid | 2–25% |
|---|---|
| Dicarboxylic acid | 5–40% |
| Vanadium as ammonium vanadate | 0.01–1.5% |
| Copper | 0.11–5.0% | adjusting the pH of the solution to 0.3 to 1.8, and treating said solution with ion exchange resin to obtain a solution in which the catalyst content is substantially reduced, adjusting the pH of the adjusted solution to 2 to 4, adding polyamine thereto which contains at least two amino groups separated by at least two carbon atoms and heating to a temperature at which a substantial portion of the polyamine reacts with said dicarboxylic acid and produces polyamide.

* * * * *